United States Patent [19]
Grosseholz et al.

[11] Patent Number: 5,980,376
[45] Date of Patent: Nov. 9, 1999

[54] METHOD AND APPARATUS FOR GUTTING FISH

[75] Inventors: Werner Grosseholz, Krummesse; Ulrich Gütte, Bad Oldesloe; Andreas Holzhüter, Lübeck; Conrad Torkler, Klein Zecher; Ralf Neumann, Lübeck, all of Germany

[73] Assignee: Nordischer Maschinenbau Rud. Bader GmbH + Co. KG, Germany

[21] Appl. No.: 09/133,039

[22] Filed: Aug. 12, 1998

[30] Foreign Application Priority Data

Aug. 12, 1997 [DE] Germany ................. 19734753
Jul. 1, 1998 [DE] Germany ................. 19829376

[51] Int. Cl.⁶ .................................................. A22C 25/14
[52] U.S. Cl. ........................ 452/116; 452/109; 452/121
[58] Field of Search .................... 452/116, 118, 452/109, 121

[56] References Cited

U.S. PATENT DOCUMENTS 4,091,506  5/1978  Soerensen et al. ............... 452/116
4,507,823  4/1985  Wulff ................................ 452/121
4,507,824  4/1985  Sawusch .......................... 452/121
5,026,318  6/1991  Jahnke ............................. 452/121

FOREIGN PATENT DOCUMENTS 45 467    11/1966  Germany .
36 32 561  5/1988  Germany .
39 15 815 11/1990  Germany .
466674     6/1937  United Kingdom .

*Primary Examiner*—Willis Little
*Attorney, Agent, or Firm*—Knobbe, Martens, Olson & Bear LLP

[57] ABSTRACT

The invention pertains to an apparatus for gutting fish which serves for preventing flaws that reduce the quality e.g., colon and blood residues or damage to the walls of the abdominal cavity, and for attaining a highly aesthetic product. The invention proposes that the rectum is initially supported by inserting an element through the anus in order to separate the rectum within the region of the anus, and that the lateral and dorsal connections between the rectum and the abdominal walls are subsequently separated.

27 Claims, 6 Drawing Sheets

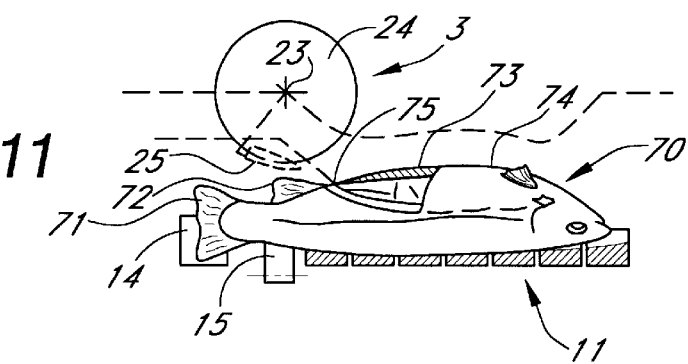

METHOD AND APPARATUS FOR GUTTING FISH

FIELD OF THE INVENTION

The invention pertains to a method for gutting fish, in particular, farm-raised fish, e.g., fish of the salmon species. The invention pertains further to an apparatus for carrying out such a method.

BACKGROUND OF THE INVENTION

In order to gut fish, the abdominal cavity is initially opened by slitting the abdominal wall surrounding the abdominal cavity from the tail end along the abdominal seam while simultaneously separating the rectum within the region of the anus. The guts are subsequently removed by suction and progressively collected from the anus to the head. An apparatus for carrying out said method includes a conveyor with at least one fish receptacle for accommodating the fish to be processed while it lies on its back and for conveying said fish along a transport path with its tail pointing forward. A processing means is arranged above the transport path, which can be controlled relative to the transport path and parallel to the plane of symmetry of the fish. The processing means opens the abdominal cavity along the abdominal seam as well as removes the guts by suction. The apparatus further includes a means for acquiring specific fish data.

Such a gutting process is the object of German patent number DE 39 15 815. This document describes an apparatus in which the fish to be processed is transported while it lies on its back and its tail points forward, wherein the abdominal cavity is opened from the anus to the gill cavity along the abdominal seam and the guts are removed by suction.

German Democratic Republic patent number DD 45467 discloses a method for opening the abdominal cavity of live fish. The disadvantage of this method is that an additional circular knife is provided which engages the slot of a puncturing tool that penetrates the abdominal cavity of the fish from the gill cavity and emerges at an incision produced within the region of the anus after slitting the abdominal wall. The cutting accuracy which can be attained with this method is very low, i.e., the cuts frequently extend into the adjacent flesh because the colon opening cannot be exactly located and inferior qualities result. In addition, it is possible that the membranes above the blood kidney are damaged as a result of faulty cuts within the region of the colon, wherein contamination and consequently an inferior product quality result in this case.

According to the prior art cited in this document, a flawless result, i.e., a qualitatively satisfactory end product, cannot always be attained, even when utilizing a device with the previously described characteristics. However, this represents a decisive factor, in particular, with valuable fish. When processing these types of fish, the processing must occur with a high precision such that reliable results are attained. Flaws and imperfections such as colon and blood residues, damage to the wall of the abdominal cavity and the like which reduce the quality, need to be reliably prevented. This reliable processing also needs to be ensured when processing fish of different sizes.

SUMMARY OF THE INVENTION

The invention aims to improve the mechanized gutting of fish in such a way that the manual processing of such fish which traditionally still represents the predominant practice can be carried out in mechanized fashion such that an acceptable result is attained.

At least essential portions of this objective are attained with an apparatus of the initially mentioned type which is used in a method in which the separating of the rectum within the region of the anus contains the following steps: supporting at least the end region of the rectum via the anus, separating the lateral connections between the rectum and the abdominal walls while the end region of the rectum is supported and separating the dorsal connections between the rectum and the abdominal wall. The internal support is realized such that the cross-section of the anus and the rectum is simultaneously stretched in the direction of the longitudinal axis of the fish. An apparatus suitable for carrying out this method is characterized by the fact that a processing unit includes a cutter device to open the abdomen and a separator to separate the rectum within the region of the anus which is arranged directly behind the cutter device. The cutter device contains a pair of circular knives spaced apart from one another. A puncturing tool is displacable between a retracted position and a functional position and is provided with a guide tip arranged between the circular knives. The guide tip protrudes over the edges of the circular knives within their effective region in the functional position and is essentially directed opposite the transport direction of the fish. The separator contains a separating tool configured to be briefly displaced into the abdominal cavity within the region of the anus. The penetration depth of the separating tool extends into the region of the blood stream.

In order to precisely align and guide the fish, each fish receptacle may contain a series of supports. A controllable clamping mechanism for taking hold of the fish at its tail is respectively arranged on the leading end of each receptacle. Due to this clamping mechanism, an advantageous tension due to the stretching of the fish is attained. In this case, each fish receptacle may be equipped with a pair of flank supports that can be controlled in opposite directions synchronously referred to the plane of symmetry and advantageously improves the alignment. Consequently, one important prerequisite for separating the rectum within the region of the anus with the previously described opening and separating device is realized. These devices are preferably designed in such a way that the puncturing tool can be pivoted about the axis of the circular knives, that the distances between the circular knives is larger than the thickness of the puncturing tool, that the circular knives are provided with inner bevels, and that the separating tool can be pivoted about the axis of the circular knives.

A device arranged behind the opening and separating device may contain a first tool that is realized in the form of a suction nozzle and connected to a vacuum line. This tool essentially has the shape of a quarter circle of a tube and is provided with a suction opening that is directed opposite the transport direction of the fish, wherein a controllable slide arranged such that it shears with the end face of the suction opening and realized in the form of a scraper for separating the skins and ligaments that connect the guts to the abdominal walls within the region of the backbone is assigned to the suction opening. In this case, it is ensured that the heart can also be removed if the slide is provided with a slitting knife that is directed opposite the transport direction of the fish and serves for opening the septum (septum transversum) which separates the pericardial cavity from the abdominal cavity. The latter may, if so required, be favorably influenced by providing the processing means for removing the guts with at least one additional suction nozzle and has a smaller suction cross-section than the first suction nozzle, wherein the end of the additional suction nozzle which faces the fish is realized in the form of a scraper for separating the skins and ligaments that connect the guts to the abdominal walls with in the region of the backbone.

The exact processing sequence is controlled by a control unit that operates in dependence on signals of sensors that make it possible to acquire certain fish data, i.e., the length of the fish, the back or abdomen height, the contour, the fin position or the like. Such a measuring instrument may contain a measuring calliper that follow the contour of the abdominal seam and are functionally connected to a sensor that registers the height of the fish, wherein the measuring calliper may contain a pair of calliper arms that can be laterally displaced against the force of a spring and are functionally connected to a sensor that registers a lateral movement.

In order to achieve the most sensitive adaptation and function possible, each processing device may be functionally connected to a variable speed drive that controls the adjusting motion, and the conveyor may be driven by a variable speed drive that is preferably realized in the form of step motors. Since the aforementioned fish data merely pertain to the outer contour of the fish, i.e., a product, the dimensional proportions of which may vary within certain limitations, the adaptability of the processing devices can, in particular, when processing the "interior," be additionally improved if the transmission of the adjusting motion of the variable speed drives of the processing device for removing the guts respectively takes place via an elastic intermediate element which contains a switch that causes a termination of the adjusting motion of the variable speed drives of the processing devices for removing the guts respectively takes place via an elastic intermediate element which contains a switch that causes a termination of the adjusting motion of the variable speed drive if a resistance is encountered during the activating motion. However, this requires a resistance moment that is only generated if a tool comes in contact with the bone structure, e.g., the structure of the backbone and/or the ribs on the ventral site or lateral sets of vertebra. In order to achieve a progression of the abdominal cut which does not damage the guts, in particular, the gall, the device for opening the abdomen may be controlled with respect to its activation and retraction time as well as the depth of its cut in dependence on the contour of the abdominal seam.

In order to attain an optimal processing speed and a high throughput, the conveyor may be driven with a speed that periodically changes, namely in dependence on the position of the fish to be processed.

BRIEF DESCRIPTION OF THE DRAWINGS

The invention is described in detail below with reference to one embodiment that is illustrated in the drawings. The drawings include the following figures:

FIG. 11 is a side view of a section of the processing zone in the instant in which the device for opening the abdomen is activated;

FIG. 12 is a section according to FIG. 11, wherein the separating device is displaced into the abdominal cavity;

FIG. 13 is a section according to FIG. 11 shortly before the first tool for removing the guts is activated;

FIG. 14 is a section according to FIG. 13 shortly before the second too is displaced into the abdominal cavity;

FIG. 15 is a section according to FIG. 14 after displacing the third tool into the abdominal cavity, wherein the device for opening the abdomen is retracted;

FIG. 16 is a partial cross-section through the device for opening the abdomen.

DETAILED DESCRIPTION OF THE PREFERRED EMBODIMENT

Figure 1:
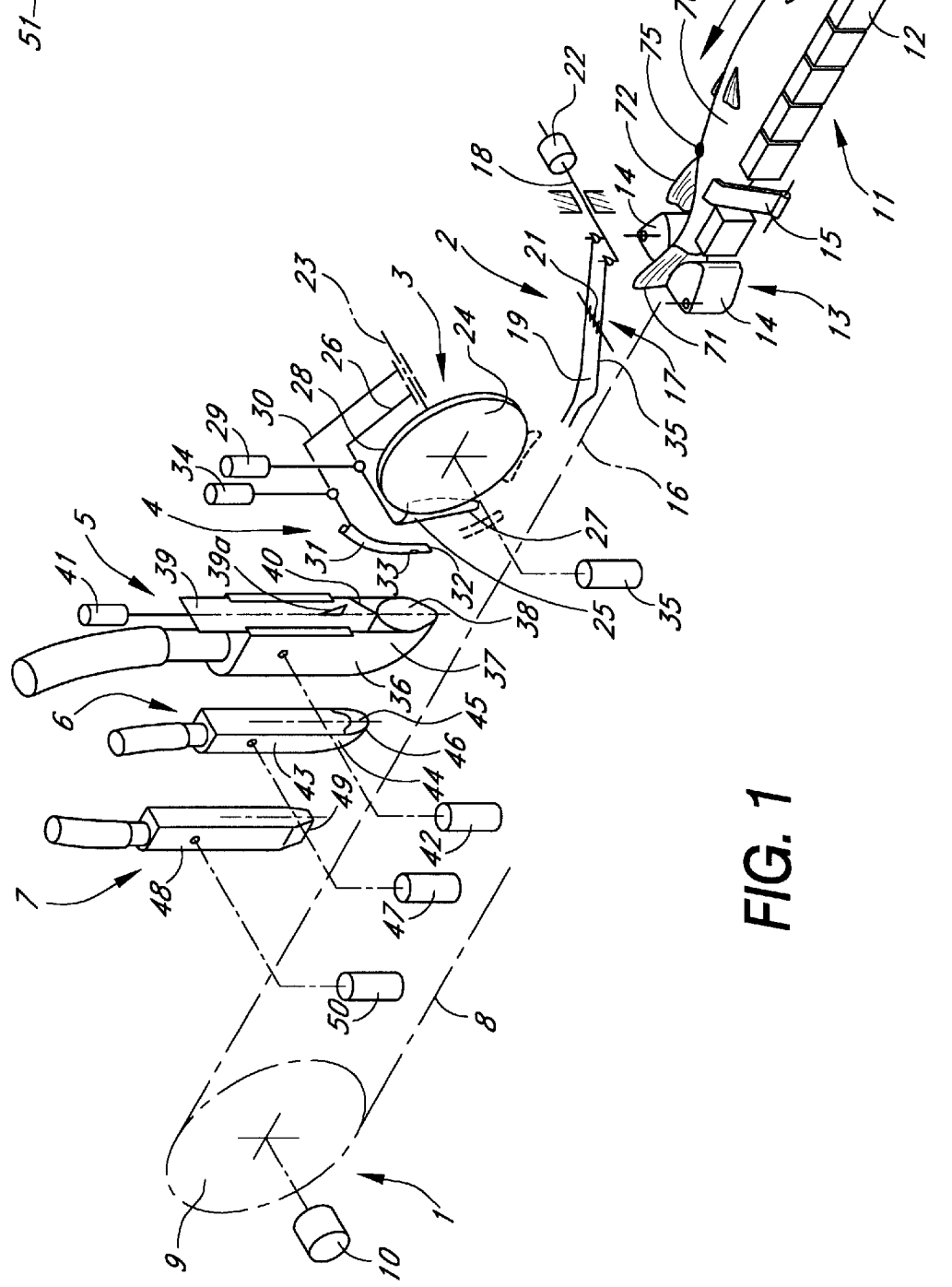
FIG. 1 is a simplified perspective representation of a section of the processing zone.

FIG. 1 shows that a gutting apparatus according to the invention comprises a conveyor 1 for transporting the fish to be processed and a processing unit which includes a measuring device 2 for acquiring specific fish data, a device 3 for opening the abdomen which contains a device 4 for separating the rectum and processing means for removing the guts which consist of a first suction nozzle 5, a second suction nozzle 6 and a third suction nozzle 7.

In FIG. 1, as well as in other figures showing the fish to be processed, the fish is exemplary shown as non-decapitated. It is contemplated that the apparatus is configured to process decapitated fish and non-decapitated fish.

These elements are arranged in a machine frame of a machine for processing fish which is not illustrated in detail. The conveyor 1 is realized in the form of an endless chain conveyor 8 that is guided around two pulleys 9 and driven by a step motor 10. The chain conveyor 8 is equipped with fish receptacles 11 that consist of a row of support prisms 12 and a clamping mechanism 13 arranged at the leading end of each receptacle. This clamping mechanism consists of a pair of clamping jaws 14, the mutual distance of which can be adjusted. The control is suitably realized by means of not-shown curved rails that are rigidly mounted to the frame. A pair of oppositely synchronized flank supports 15 that can be controlled by the clamping jaws 14 is arranged directly behind the clamping jaws 14. The upper section of the conveyor 1 follows a linear transport path 16 which extends from a lower right corner to an upper left corner so that the fish is transported from the lower right corner to the upper left corner as indicated in FIG. 1. In the illustrated embodiment, the device 4 and the nozzles 5, 6, 7 are located downstream relative to the devices 2, 3 along the transport path 16 of the fish.

In one embodiment of the apparatus, the transport path 16 extends underneath the processing unit including the devices 2, 3, 4, 5, 6, 7, and the fish to be processed is positioned on its back. It is contemplated that the apparatus can be configured, for example, to position the fish on a side and to position the processing unit lateral to the transport path 16.

The measuring device 2 is arranged above the transport path 16 and consists of measuring callipers 17 that are realized in the form of a towed calliper lever 19 that can be pivoted about a transverse axis. The calliper lever 19 consists of a pair of calliper arms 20 that are arranged adjacent to one another in the form of a mirror image to both sides of the transport path 16. The free ends of these calliper arms contact one another similar to forceps under the influence of a spring 21 and can be laterally displaced in opposite directions synchronously against the force of said spring. A sensor, not shown in the figure, registers a lateral movement and is assigned to the calliper arms 20. An angle encoder 22 is connected to the transverse axis 18 of the calliper lever 19 in rotationally rigid fashion.

The device 3 for opening the abdomen is arranged on the free end of a non-shown rocker that can be pivoted about a not-shown pivoting axis which extends perpendicularly to the plane of rotation of the conveyor 1. The device 3 for opening the abdomen contains a pair of circular knives 24 mounted on a driving axle 24 such that they are spaced apart from one another, wherein a puncturing tool is mounted on a holding arm 26 that can be pivoted about the driving axle 23, i.e., concentric to the circular knives 24. The puncturing tool 25 is equipped with a guide tip 27 that protrudes over the edges 28 of the circular knives 24 and can be pivoted from a retracted position into a functional position, e.g., by means of a pneumatic actuator 29. In the functional position, the puncturing tool 25 is situated within the region of the circular knives 24 which faces the transport path 16, namely such that its guide tip 27 is directed opposite the transport direction of the fish.

A holding arm 30, on which a separating tool 31 that forms the separating device 4 is mounted, can also be pivoted about the driving axle 23. The separating tool 31 consists of a round rod that is curved concentric to the knife edges 28 and in the cutting plane of the circular knives 24. On its free end which is directed opposite the transport path 16, this round rod is provided within and edge 32 that extends transverse to its free end, wherein the back side of the round rod is provided with ripping teeth 33. The separating tool 31 can be pivoted from a retracted position into a function position, e.g., by means of a pneumatic actuator 34, wherein the dorsal connections between the rectum and the abdominal wall are separated and the blood stream is ultimately ripped open during this pivoting motion.

The device 3 for opening the abdomen can be adjusted with respect to the height above the transport path 16 together with the separating device 4, namely by means of a schematically indicated step motor 35 that acts upon both devices via a suitable not-shown gear.

The first suction nozzle 5 is arranged directly behind (downstream) the opening 3 and separating device 4. This suction nozzle consists of a tubular body 35 that is essentially directed vertical to the transport path 16. Within its lower region, the tubular body has the shape of a quarter circle 37 of a tube which contains a suction opening 38 that is directed opposite the transport direction of the fish. The lower region that surrounds the suction opening 38 is realized with a sharp outer edge that acts as a scraper and is adapted to the cross-section of the abdominal cavity. The suction opening 38 can be closed by a slide 39 that is guided such that it shears with the suction opening 38 and is provided with an edge 40 on its lower end. The slide 39 can be displaced between a position in which the suction opening 38 is open and a position in which the suction opening is closed, e.g., by means of a pneumatic actuator 41. The suction nozzle 5 is connected to a vacuum device, wherein its height above the transport path 16 can be adjusted by means of the schematically illustrated step motor 42, namely via a suitable not-shown gear. The slide 39 is provided with a slitting knife 39a on its surface that is directed opposite the transport direction of the fish.

A second suction nozzle 6 that has a smaller cross-section than the suction nozzle 5 is arranged behind the suction nozzle 5. The second suction nozzle consists of a tubular body 43 that is essentially directed vertical to the transport path 16 and connected to a vacuum device. Within its lower region, this tubular body has the shape of a quarter circle 44 of a tube, wherein the suction opening 45 is directed opposite the transport direction of the fish. The lower region which surrounds the suction opening 45 is provided with flank edges 26 which predominantly serve for scraping the flank region situated near the backbone.

The height of suction nozzle 6 above the transport path 16 can be adjusted by means of a schematically illustrated step motor 47, namely via a suitable not-shown gear.

One additional suction nozzle 7 is, if so required, arranged behind the suction nozzle 6. This suction nozzle consists of a tubular body 48 that is essentially directed vertical to the transport path 16, wherein the tubular body is connected to a vacuum device at its upper end and provided with a downwardly directed suction opening 49. The height of the suction nozzle 7 above the transport path 16 can be adjusted by means of a schematically illustrated step motor 40, namely via a suitable not-shown gear.

Figure 8:
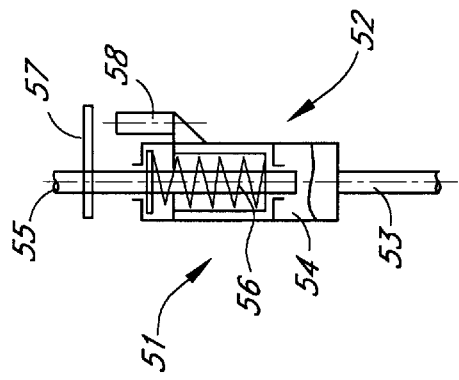
FIG. 8 is a element in the gears of the step motors 42, 47, 50.

The previously mentioned not-shown gears assigned to the step motors 42, 47, 50 respectively contain a transmission rod assembly 51 with an elastic intermediate element 52 (FIG. 8) which connects the step motor to the corresponding processing means. This intermediate element contains a driving plunger 53 with a spring housing 54, into which a driven plunger 55 penetrates against the force of a spring 56. The driven plunger 55 is provided with a switching flag 57, the distance of which from a switch 58 arranged on the spring housing 54 is reduced if the spring 56 is compressed, i.e., a switching process is triggered.

Figure 9:
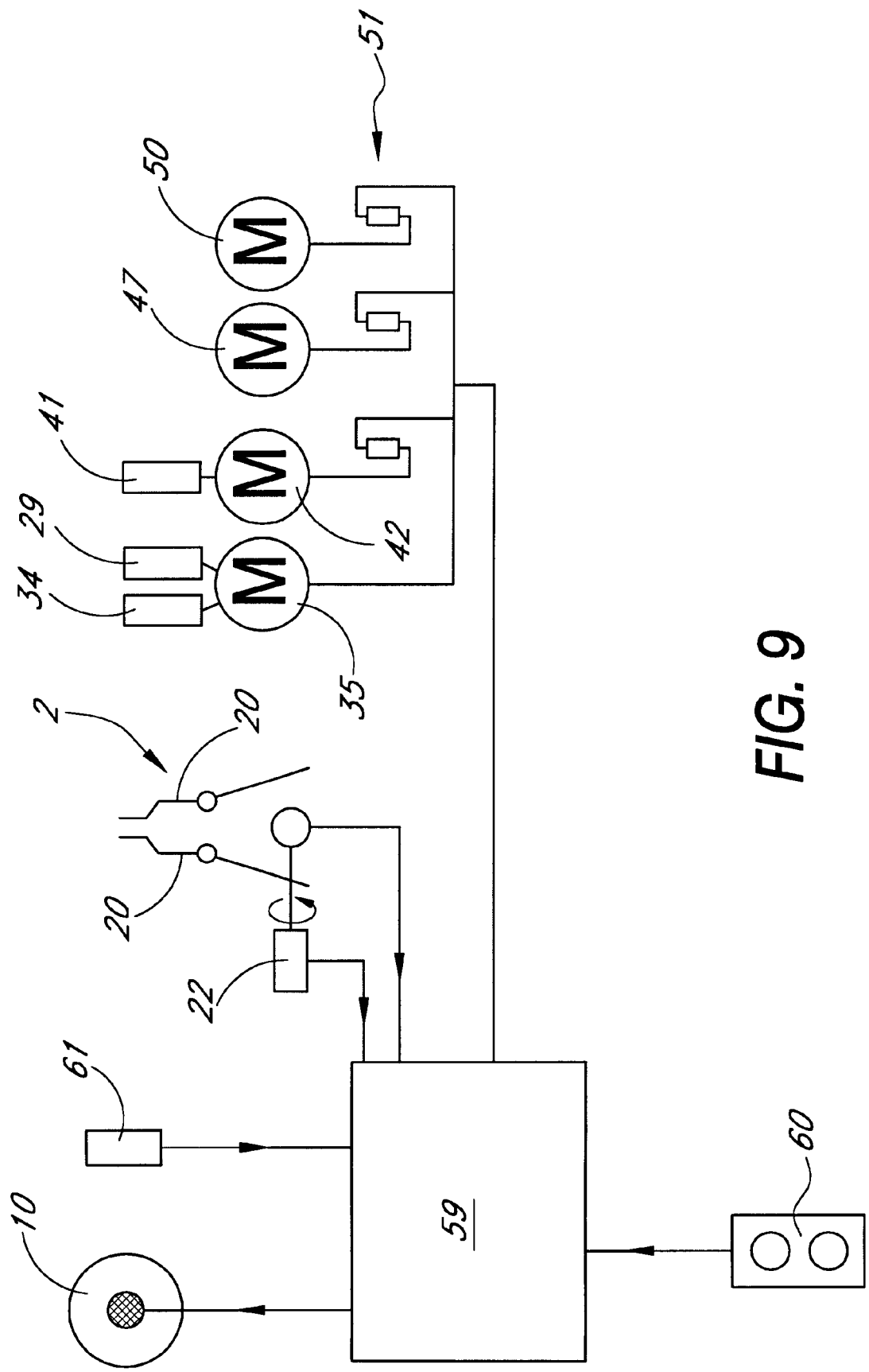
FIG. 9 is a block diagram of the device according to the invention.

The control of the device according to FIG. 9 is realized by a central control unit 59 which can be activated by an on/off switch 60. The control unit 59 is synchronized by a switch 61 that, for example, senses the position of the clamping mechanism 13. Due to this measure and the step motor 10 for driving the conveyor 1, the precise position of the fish referred to the processing means is known. The further control of the control unit 59 is realized by means of the measuring device 2 which senses the first contour and the position of the anal fin 72 while they pass between the calliper arms 20 and delivers corresponding signals to the control unit 5. The control unit 59 derives a suitable control program for the step motors 35, 42, 47, 50 from these signals.

Figure 2:
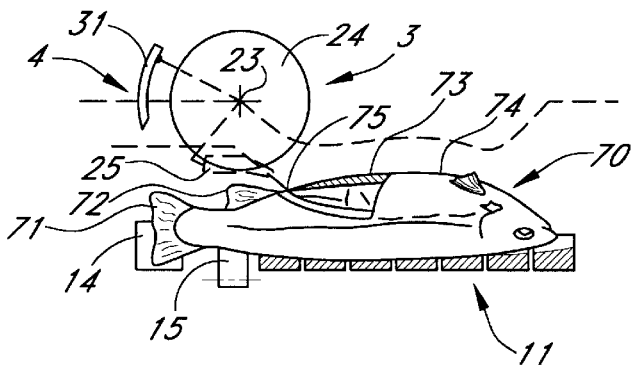
FIG. 2 is a side view of a section of the processing zone in the instant in which the device for opening the abdomen is activated.
Figure 3:
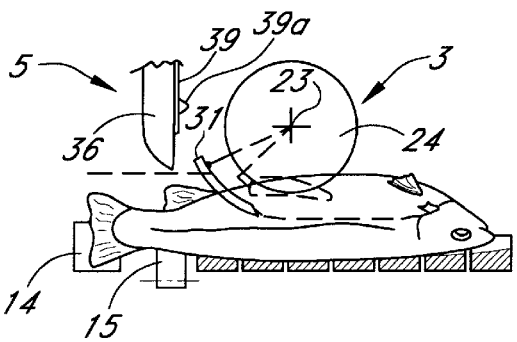
FIG. 3 is a section according to FIG. 2, wherein the separating device is displaced into the abdominal cavity.

The device according to the invention functions as described below: after the fish 70 to be processed was placed onto the fish receptacle 11 manually or in mechanized fashion such that its back points downward and the tail is positioned between the clamping jaws 14 of the clamping mechanism 13 which is moved apart in the feed position, the conveyor 1 is activated and the fish is moved forward. During this process, suitable control means that are rigidly connected to the frame ensure that the clamping mechanism 13 is closed and the flank supports 15 are actuated such that the fish is reliably taken hold of and centered within the region of the anus. The fish is transported to the measuring device 2 in this fashion, wherein said measuring device registers the progression of the height, i.e., the contour of the abdominal seam 74, as well as the length of the fish and the position of its anal fin 72. The control unit processes the corresponding signals and derives control programs for the processing means thereof. With respect to the device 3 for opening the abdomen, the control program lowers this device in such a way (FIG. 2) that the puncturing tool 25 which is situated in the functional position penetrates into the anus 75 with its guide tip 27 and simultaneously stretches the anus and the cross-section of the rectum in the longitudinal direction of the fish, i.e., the circular knives 24 are able to separate the lateral connections between the rectum and the abdominal walls without damaging the rectum. The height of the device 3 for opening the abdomen is controlled in accordance with the signals received by the control unit which, in addition to the contour, also contain the longitudinal dimensions of the fish. Consequently, the depth of the cut is limited in such a way that the guts, in particular, the gall, remain undamaged and the risk of contaminating the abdominal cavity is eliminated. The process of slitting the abdomen begins while the separating device 4 is retracted. The separating device is activated immediately thereafter by the actuator 34, namely once the anus 74 has been transported into a position in which the separating tool 31 is able to penetrate the abdominal cavity 73 within the region of the anus (FIG. 3). During this process, the rectum is separated on the dorsal side, and the blood stream (kidney) situated within the rear region of the abdominal cavity is opened by means of the edge 32 and the ripping teeth 33. The separating tool 31 is then immediately retracted again.

Figure 4:
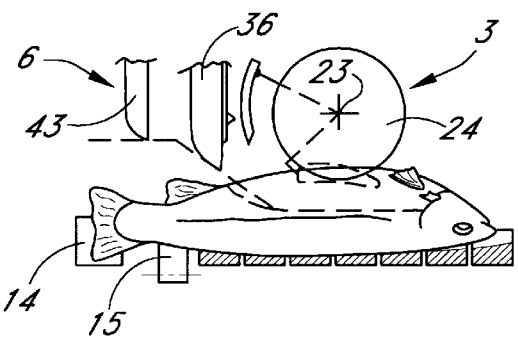
FIG. 4 is a section according to FIG. 2 shortly before the first tool for removing the guts is activated.
Figure 6:
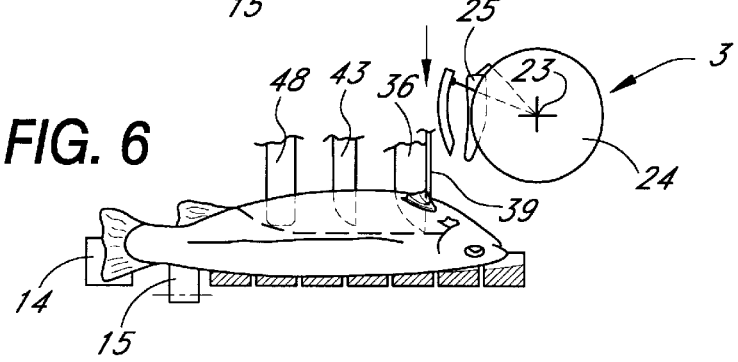
FIG. 6 is a section according to FIG. 5 after displacing the third tool into the abdominal cavity, wherein the opening and separating device is retracted.
Figure 7:
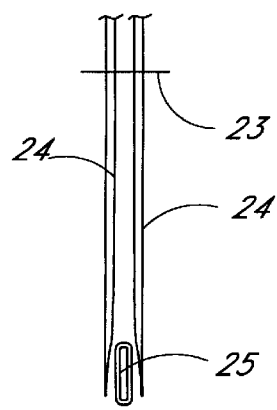
FIG. 7 is a partial cross-section through the device for opening the abdomen.

The fish reaches the first suction nozzle 5 in this prepared condition. According to FIG. 4, this first suction nozzle is displaced into the opened abdominal cavity a short distance behind the anus 75 while the slide 39 is retracted and begins to remove the guts by suction. During this process, the height of the suction nozzle is controlled by means of a readjusting unit formed by the elastic intermediate element 52 according to FIG. 8. This elastic intermediate element causes the step motor 42 to be switched off if the suction nozzle 5 encounters a resistance. Consequently, it is possible to control the suction nozzle 5 in such a way that it can be individually guided along the base of the abdominal cavity with its scraping edge that is situated within the lower region of the suction opening 38. The retraction of the suction nozzle 5 takes place at the end of the abdominal cavity situated on the side of the head. In this case, the slide 39 is moved into the position in which it closes the suction opening 38 such that the guts that are still fixed on the side of the head are sheared off and the septum transversum is cut open by means of the slitting knife 39a (FIG. 6).

Figure 5:
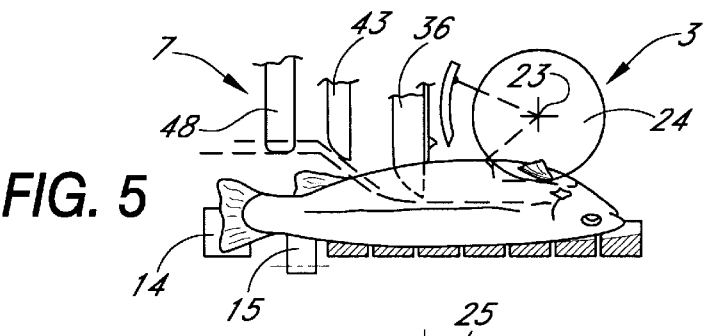
FIG. 5 is a section according to FIG. 4 shortly before the second tool is displaced into the abdominal cavity.

In the meantime, the fish has reached the position in which the second suction nozzle 6 is displaced into the abdominal cavity 73. This is realized in such a way that the suction nozzle 6 separates the skins and ligaments situated on both sides of the backbone within the front region of the abdominal cavity with its flank edges 46 and removes the heart by suction (FIG. 5). In this case, the height of the suction nozzle is controlled analogous to the first suction nozzle 5.

A subsequent cleaning, in particular, the removal of blood residues, is carried out with a last suction nozzle 7. The height of the suction nozzle 7 is also controlled analogous to the first suction nozzle 5 (FIG. 6).

Figure 10:
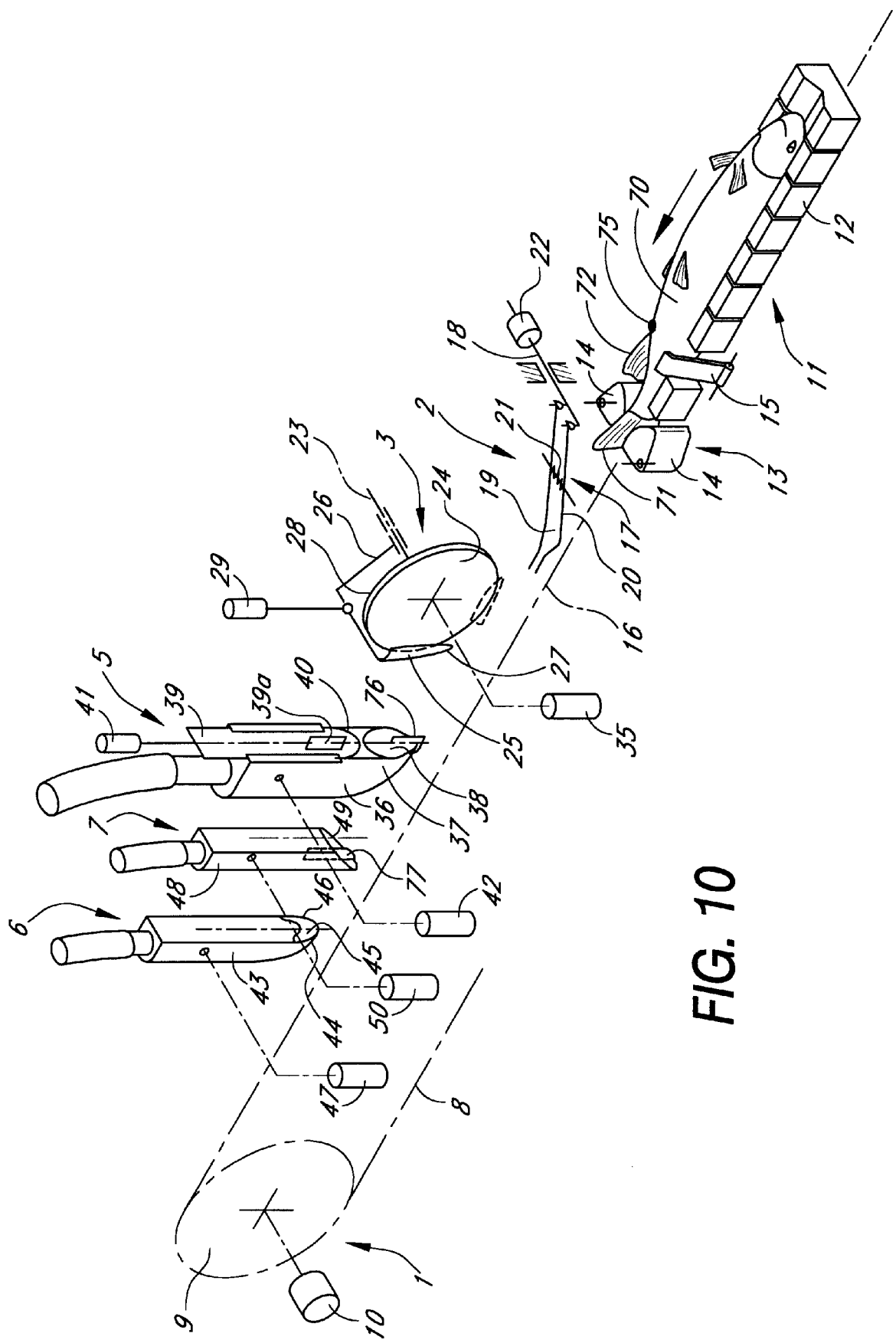
FIG. 10 is a simplified perspective representation of a section of the processing zone.
Figure 17:
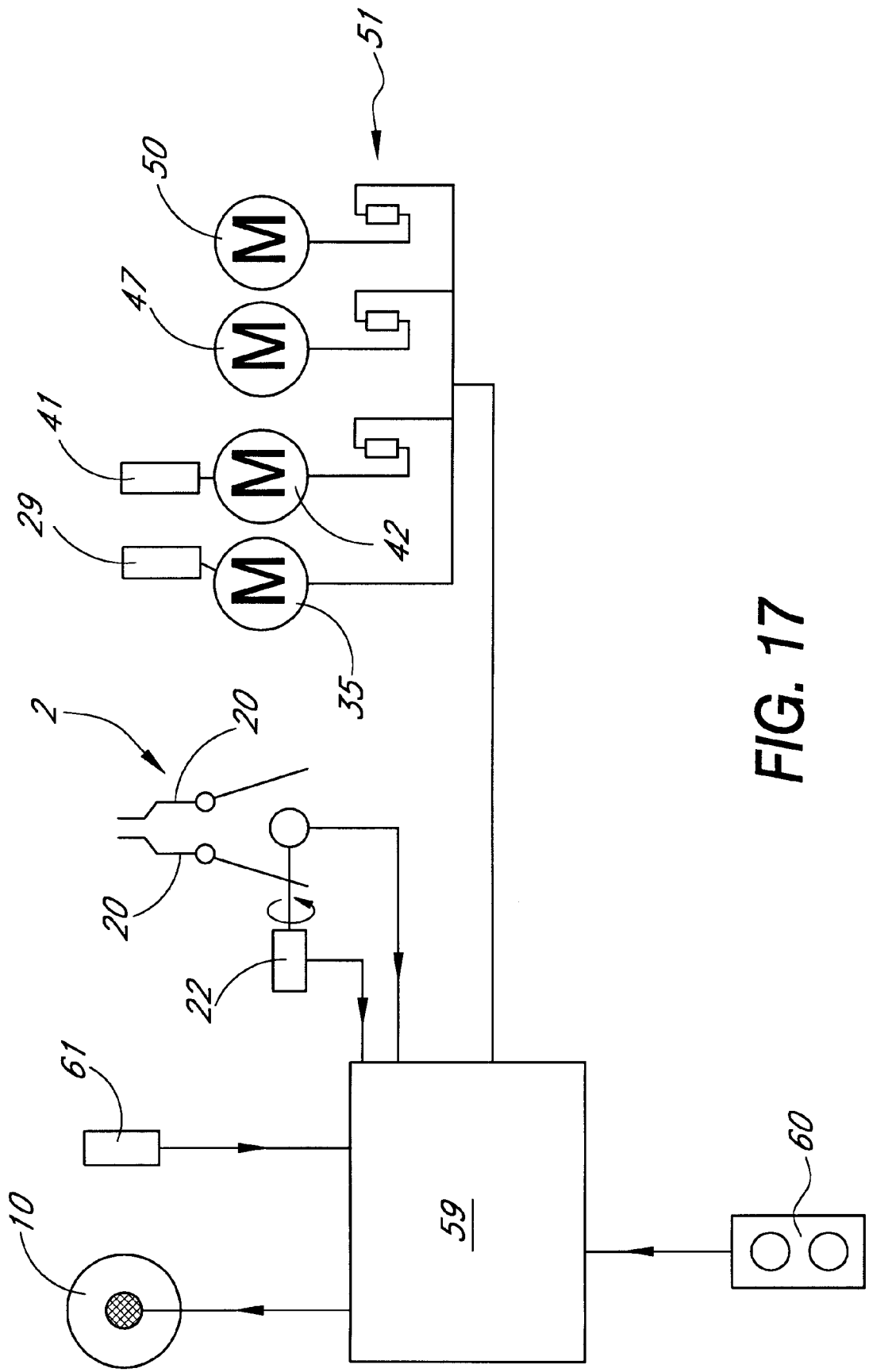
FIG. 17 is a block diagram of the device according to the invention.

An alternative embodiment of the gutting device contains a conveyor 1 for transporting the fish to be processed, a measuring device 2 for acquiring specific fish data, a device 3 for opening the abdomen and processing means for removing the guts which consist of a first suction nozzle 5, a second suction nozzle 7 and a third suction nozzle 6 (FIG. 10).

These elements are arranged in a machine frame of a machine for processing fish which is not illustrated in detail. The conveyor 1 is realized in the form of an endless chain conveyor 8 that is guided around two pulleys 9 and driven by a step motor 10. The chain conveyor 8 is equipped with fish receptacles 11 that consist of a row of support prisms 12 and a clamping mechanism consists of a pair of climbing jaws 14, the mutual distance of which can be adjusted. The control is suitably realized by means of not-shown curved rails that are rigidly mounted to the frame. A pair of oppositely synchronized flank supports 15 that can be controlled by the clamping jaws 15 is arranged directly behind the clamping jaws 14. The upper section of the conveyor 1 follows a linear transport path 16.

The measuring device 2 is arranged above the transport path 16 and consists of measuring callipers 17 that are realized in the form of a towed calliper lever 19 that can be pivoted about a transverse axis. The calliper lever 19 consists of a pair of calliper arms 20 that are arranged adjacent to one another in the form of a mirror image to both sides of the transport path 16. At their free end, the calliper arms contact one another like forceps under the influence of a spring 21, wherein said calliper arms can be laterally displaced in opposite directions. synchronously against the force of said spring. A not-shown sensor which registers a lateral movement is assigned to the calliper arms 20. An angle encoder 22 is connected to the transverse axis 18 of the calliper lever 19 in rotationally rigid fashion. Due to the clamping mechanism that clamps the tail and a light barrier that registers the head end of the fish, the length of each fish is registered and forwarded to a control unit that controls the machine. In an alternative embodiment, a spring-loaded probe that transmits a head end signal to the control unit is provided for acquiring the head end of the fish. Due to the morphologic properties of the fish as well as the length information obtained from the individual measurements, the anus or the anus fin of the fish is expected in a defined region of the fish, i.e., the lateral exclusion of the calliper arms 20 is forwarded to the control unit as information regarding the arrival of the anal fin 72. In this case, the calliper arms 20 are initially displaced outward by the anal fin 72. The control unit registers this as the end of the anal fin situated on the side of the tail. After the anal fin 72 of the fish is moved out of the region of the calliper arms 20, the calliper arms 20 snap together again and the control unit registers this as the end of the anal fin on the side of the head. Due to the fact that the opening of the anus 75 is arranged on the end of the anal fin situated on the side of the head, the position of the end of the anal fin 72 situated on the side of the head and consequently the position of the anus 75 of each fish is transmitted to the ensuing processing means.

The device 3 for opening the abdomen is arranged on a not-shown rocker with its free end, wherein said rocker can be pivoted about a not-shown pivoting axis which extends perpendicular to the plane of rotation of the conveyor 1. FIG. 11 shows that the device 3 for opening the abdomen contains a circular knife 24 that is mounted on a driving axle 23. A puncturing tool 25 that is mounted on a holding arm 26 which can be pivoted about the driving axle 23 of the circular knife 24 and consequently concentrically pivoted about the circular knife 24 is arranged underneath the circular knife. The puncturing tool 25 is equipped with a guide tip 27 that protrudes over the edge 28 of the circular knife and can be pivoted from a retracted position into a functional position, e.g., by means of a pneumatic actuator 29. In the functional position, the puncturing tool 25 is situated within the region of the circular knife 24 which faces the transport path 16, namely such that the guide tip 27 is directed opposite the transport direction of the fish.

The first suction nozzle 5 is arranged directly behind the device 3 for opening the abdomen. The first suction nozzle consists of a tubular body 36 that is essentially directed vertical to the transport path 16, wherein the tubular body has the shape of a quarter circle 37 of a tube within its lower region and is provided with a suction opening 38 that is directed opposite the transport direction of the fish. The lower region that surrounds the suction opening 38 is shown in FIG. 12. This lower region has a sharp outer edge that acts as a scraper 76 and is adapted to the cross-section of the abdominal cavity. This scraper 76 opens the membranes which are arranged above the blood kidney, namely over a region which essentially extends from the ventral fin into the head of the fish. The suction opening 38 can be closed by a slide 39 that shears with the suction opening 38 and is provided with an edge 40 on its lower end. the slide 39 can be displaced between a position in which the suction opening 38 is open and a position in which the suction opening is closed, e.g., by means of pneumatic actuator 41. The slide acts like a guillotine and is provided with a slitting knife 39a (FIG. 10) which opens the septum between the pericardium and the abdominal cavity in order to bare the heart which is removed by suction in a subsequent step. The suction nozzle 5 is connected to a vacuum device, wherein the height of this suction nozzle above the transport path 16 can be adjusted by means of a schematically illustrated step motor 42, namely via a suitable not-shown gear. The slide 39 is provided with a slitting knife 39a on its surface which is directed opposite the transport direction of the fish.

A second suction nozzle 7 with a smaller cross-section is arranged behind the suction nozzle 5. This second suction nozzle consists of a tubular body 48 that is essentially directed perpendicularly to the transport path 16 and connected to a vacuum device at its upper end, wherein a suction opening 49 that is directed opposite the transport direction of the fish is arranged within its lower region. FIG. 10 and FIG. 13 show that the region which surrounds the suction opening 49 is provided with a knife edge 77 for opening the membranes above the blood kidney from the anus up to approximately the ventral fin.

The height of the suction nozzle 7 above the transport path 16 can be adjusted by means of a schematically illustrated step motor 50, namely via a suitable not-shown gear.

One additional suction nozzle 6 is arranged behind the suction nozzle 7. This additional suction nozzle consists of a tubular body 43 that is essentially directed perpendicularly to the transport path 16 and connected to a vacuum device at its upper end, wherein a suction opening 49 that is directed opposite the transport direction of the fish is provided on this suction nozzle as shown in FIG. 10. The height of the suction nozzle 6 above the transport path 16 can be adjusted by means of a schematically illustrated step motor 44, namely via a suitable not-shown gear.

The previously mentioned not-shown gears assigned to the step motors 42, 47, 50 respectively contain a transmission rod assembly 51 with an elastic intermediate element 52 (FIG. 8) which connects the step motor to the corresponding processing means. This intermediate element contains a driving plunger 53 with a spring housing 54, into which a driven plunger 55 penetrates against the force of a spring 56. The driven plunger 55 is provided with a switching flag 57, the distance of which from a switch 58 arranged on the spring housing 54 is reduced if the spring 56 is compressed, i.e., switching process is triggered.

The control of this device is realized by means of a central control unit 59 according to FIG. 9 which can be activated by an on/off switch 60. The control unit 59 is synchronized by a switch 61 that, for example, senses the position of the clamping mechanism 13. Due to the clamping mechanism that clamps the tail and a light barrier that indicates the head end of the fish, the length of each fish is registered and forwarded to the control unit that controls the machine. Due to this measure and the step motor 10 that drives the conveyor 1, the exact position of the fish referred to the processing means is known. The further control of the control unit 59 is realized by means of the measuring device 2 which senses the fish contour and the position of the anal fin 72 while the fish passes between the calliper arms 20 and delivers corresponding signals to the control unit 5. The control unit 59 drives a suitable control program for the step motors 35, 42, 47, 50 from these signals.

After the fish 70 to be processed is placed onto the fish receptacle 11 manually or in mechanized fashion such that its back points downward and the tail is situated between the clamping jaws 14 of the clamping mechanism 13 that is spread apart in the feed position, the conveyor 1 is activated and the fish is pushed forward. During this process, suitable control means that are rigidly connected to the frame ensure that the clamping mechanism 13 is closed and the flank supports 15 are actuated, i.e., the fish is reliably taken hold of and centered within the region of the anus. The fish reaches the measuring device 2 which registers the progression of the height, i.e., the contour of the abdominal seam 74, as well as the length of the fish and the position of its anal fin 72 in this condition. The control unit processes the corresponding signals and devices control programs for the processing means thereof. With respect to the device 3 for opening the abdomen, the control program lowers this device (FIG. 2) in such a way that the puncturing tool 25 with its guide tip 27 which is situated in the functional position is inserted into the anus 75 at the position previously determined for each fish, wherein the anus and the cross-section of the rectum are stretched in the longitudinal direction of the fish such that the circular knife 24 is able to separate the lateral connections between the rectum and the abdominal walls. The height of the device 3 for opening the abdomen is controlled in accordance with the signals received by the control unit which, in addition to the contour, contain the longitudinal dimensions of the fish, i.e., the depth of the cut is limited in such a way that the guts, in particular, the gall, remain undamaged and the risk of contaminating the abdominal cavity is eliminated.

The fish then reaches the first suction nozzle 5 that is displaced into the opened abdominal cavity a short distance behind the anus 75 while the slide 39 is retracted and begins to remove the guts by suction. In this case, the height is controlled by means of a readjusting unit formed by the elastic intermediate element 52 according to FIG. 8. This elastic intermediate element causes the step motor 42 to be switched off if the suction nozzle 5 encounters a resistance. Consequently, it is possible to control the suction nozzle 5 in such a way that it is individually guided along the base of the abdominal cavity with its scraping edge that is situated within the lower region of the suction opening 38. The retraction of the suction nozzle 5 takes place at the end of the abdominal cavity which is situated on the side of the head. At this location, the slide 39 is moved into the position in which the suction opening 38 is closed such that the guts which are still fixed on the side of the head are sheared off and the septum transversum is cut open by means of the slitting knife 39*a* (FIG. 9, FIG. 10).

In the meantime, the fish has reached the position in which the second suction nozzle 7 is displaced into the abdominal cavity 73. In this case, the suction nozzle 7 opens the membranes of the fish above its blood kidney from the anus up to the ventral fin with its knife edge 77. The height of the second suction nozzle is controlled analogous to the first suction nozzle 5.

The last suction nozzle 6 serves for carrying out a subsequent cleaning, in particular, the removal of blood residues. The height of this suction nozzle 6 is also controlled analogous to the first suction nozzle 5.

The previously described devices make it possible to produce the so-called "Princess Cut" which could only be realized manually until now in mechanized fashion. This term refers to a gutting method which ensures results that fulfill the highest quality requirements, i.e., valuable fish can now be processed in mechanized fashion for the first time.

While the above detailed description has shown, described and identified several novel features of the invention as applied to a preferred embodiment, it will be understood that various omissions, substitutions and changes in the form and details of the described embodiments may be made by those skilled in the art without departing from the spirit of the invention. Accordingly, the scope of the invention should not be limited to the foregoing discussion, but should be defined by the appended claims.

What is claimed is:

1. A method for gutting fish having an abdominal cavity, a rectum and an anus, comprising the steps of:
   opening the abdominal cavity by slitting an abdominal wall surrounding the abdominal cavity from a tail end along an abdominal seam;
   separating the rectum within a region of the anus by supporting at least an end region of the rectum via the anus, separating lateral connections between the rectum and the abdominal walls while the end region of the rectum is supported, and separating dorsal connections between the rectum and the abdominal wall; and
   removing the guts by suction and progressively collecting them from the anus toward a head portion of the fish.

2. The method according to claim 1, wherein supporting at least the end region of the rectum is achieved by stretching a cross-section of the anus and the rectum in a direction of a longitudinal axis of the fish.

3. An apparatus for gutting fish having a tail, an abdominal cavity, a rectum and an anus, comprising:
   a conveyor having at least one receptacle for accommodating the fish to be processed while positioned on a backside, and conveying said fish along a transport path with the tail pointing forward;
   a measuring instrument configured to acquire specific fish data; and
   a processing unit arranged above the transport path and configured to be controlled relative to the transport path and parallel to a plane of symmetry of the fish, and to open the abdominal cavity along an abdominal seam and to remove the guts by suction, the processing unit comprising:
   a cutter device configured to open the abdomen and to include a pair of circular knives spaced apart from one another, each circular knife having an edge,
   a puncturing tool configured to be positionable in a retracted position and a functional position, and provided with a guide tip arranged between the circular knives, the guide tip protruding over the edges of the circular knives within an effective region in the functional position, and being directed in a direction opposite the transport direction of the fish;
   a separator configured to separate the rectum within the region of the anus, the separator being arranged directly behind the cutter device and having a separating tool configured to be briefly displacable into the abdominal cavity within the region of the anus, whereby the separating tool extends into the region of the blood stream.

4. The apparatus according to claim 3, wherein each receptacle contains a series of supports, and wherein a controllable clamping mechanism is provided on a leading edge of each receptacle, the clamping mechanism being configured to clamp the tail of the fish.

5. The apparatus according to claim 3, wherein each receptacle comprises at least one pair of flank supports configured to be controlled synchronously in directions opposite to the plane of symmetry of the fish.

6. The apparatus according to claim 3, wherein the puncturing tool is configured to be pivoted about an axis of the circular knives.

7. The apparatus according to claim 3, wherein a distance between the circular knives is larger than a thickness of the puncturing pool.

8. The apparatus according to claim 3, wherein the circular knives are provided with inner bevels.

9. The apparatus according to claim 3, wherein the separating tool is configured to be pivoted about the axis of the circular knives.

10. The apparatus according to claim 3, wherein the processing unit includes a first tool formed as a suction nozzle and is connected to a vacuum device, wherein the suction nozzle essentially has the shape of a quarter circle of a tube, wherein the suction nozzle includes a suction opening directed opposite the transport direction of the fish, wherein a controllable slide, arranged such that it shears with an end face of the suction opening, is assigned to the suction opening, and wherein an end of the slide facing the fish is formed as a scraper for separating skins and ligaments that connect the guts to the abdominal walls within the region of the backbone.

11. The apparatus according to claim 10, wherein the slide comprises a slitting knife directed opposite the transport direction of the fish and serves for opening a septum that separates a pericardial cavity from the abdominal cavity.

12. The apparatus according to claim 10, wherein the processing unit includes at least one additional suction nozzle arranged behind the first suction nozzle, the additional suction nozzle having a smaller cross-section than the first suction nozzle, wherein an end of the additional suction nozzle faces the fish and is formed as a scraper for separating skins and ligaments that connect the guts to the abdominal walls in the region of the backbone.

13. The apparatus according to claim 3, wherein the measuring instrument includes measuring callipers mounted to follow a contour of the abdominal seam, wherein said measuring callipers are functionally connected to a sensor that registers a height of the fish.

14. The apparatus according to claim 13, wherein the measuring callipers contain a pair of calliper arms configured to be laterally displaced against a force of a spring, and are functionally connected to a sensor that registers a lateral movement of either calliper arm.

15. The apparatus according to claim 3, wherein the processing unit is functionally connected to at least one variable speed drive that controls the processing unit.

16. The apparatus according to claim 3, wherein the conveyor is driven by a first variable speed drive.

17. The apparatus according to claim 16, wherein each variable speed drive includes a step motor providing an adjusting motion.

18. The apparatus according to claim 17, further comprising an elastic intermediate element with a switch, the intermediate element configured to convey the adjusting motion of the variable speed drives to the processing unit, said switch configured to cause a termination of the adjusting motion of the variable speed drive if a resistance is encountered during the activating motion.

19. The apparatus according to claim 3, wherein the processing unit, with respect to activation and retraction times, is configured to be controlled in dependence on the contour of the abdominal seam.

20. The apparatus according to claim 3, wherein the cutter device, with respect to activation and retraction times and depth of a cut, is configured to be controlled in dependence on the contour of the abdominal seam.

21. The apparatus according to claim 16, wherein the variable speed drive of the conveyor, with respect to a rotational speed, is configured to be controlled in dependence on the position of the fish to be processed.

22. An apparatus for gutting fish, comprising:

at least one fish receptacle;

at least one transport path;

at least one means for determining morphologic properties of the fish;

at least one control unit; and at least one processing means, the processing means for opening the abdominal cavity and/or removing guts, the processing means communicating with the means for determining morphologic properties via the control unit.

23. The apparatus according to claim 22, wherein the processing means contains at least one circular knife.

24. The apparatus according to claim 23, further comprising a puncturing tool concentrically pivoted about the circular knife.

25. The apparatus according to claim 22 or 23, wherein the processing means contains at least one suction nozzle.

26. An apparatus for gutting fish having a tail, an abdominal cavity, a rectum and an anus, comprising:

a conveyor having at least one fish receptacle configured to accommodate the fish to be processed while positioned on a backside, and to convey said fish along a transport path with the tail pointing forward;

means for acquiring specific fish data; and processing means arranged adjacent the transport path and configured to be controlled relative to the transport path and parallel to a plane of symmetry of the fish for opening the abdominal cavity along an abdominal seam as well as removing the guts by suction, the processing means comprising:

a device for opening the abdomen having a pair of circular knives that are spaced apart from one another, a puncturing tool configured to be positioned between a retracted position and a functional position and provided with a guide tip arranged between the circular knives, the guide tip protruding over edges of the circular knives within their effective region in the functional position and is directed opposite the transport direction of the fish;

a device for separating the rectum within the region of the anus, the device being arranged directly behind the device for opening the abdomen, and having a separating tool configured to be temporarily displaced into the abdominal cavity within the region of the anus, wherein a penetration depth of the separating tool extends into the region of the blood stream.

27. An apparatus for gutting fish having a tail, an abdominal cavity, a rectum and an anus, comprising:

a conveyor having at least one fish receptacle configured to hold the fish to be processed while positioned on a backside while conveying said fish along a transport path with the tail pointing forward;

processing means configured to open the abdominal cavity along an abdominal seam and to remove the guts by suction, the processing means comprising:

a device having a cutting edge positioned to cut an opening in the abdomen;

a puncturing tool configured to be positioned between a retracted position and a functional position and provided with a guide tip positionable adjacent the cutting edge, the puncturing tool further configured to support at least an end region of the rectum via the anus; and a device for separating the rectum within the region of the anus, the device being arranged directly behind the device for opening the abdomen, and having a separating tool configured to be displaced into the abdominal cavity within the region of the anus, wherein a penetration depth of the separating tool extends into the region of the blood stream.

* * * * *

UNITED STATES PATENT AND TRADEMARK OFFICE
CERTIFICATE OF CORRECTION

PATENT NO. : 5,980,376
DATED : November 9, 1999
INVENTOR(S) : Grosseholz et al.

Page 1 of 1

It is certified that error appears in the above-identified patent and that said Letters Patent is hereby corrected as shown below:

Column 12,
Line 33, please change "pool" to -- tool --.

Signed and Sealed this

Twenty-fifth Day of December, 2001

Attest:

Attesting Officer

JAMES E. ROGAN
Director of the United States Patent and Trademark Office